US011882108B2

(12) United States Patent
Chung et al.

(10) Patent No.: US 11,882,108 B2
(45) Date of Patent: *Jan. 23, 2024

(54) APPLICATION USER SINGLE SIGN-ON

(71) Applicant: Transform SR Brands LLC, Hoffman Estates, IL (US)

(72) Inventors: Eui Chung, Seattle, WA (US); Jen-Hao Yang, Schaumburg, IL (US); Bharath Sridharan, Hoffman Estates, IL (US); Jim Pier, Highland Village, TX (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,556

(22) Filed: Feb. 23, 2023

(65) Prior Publication Data
US 2023/0198974 A1 Jun. 22, 2023

Related U.S. Application Data

(63) Continuation of application No. 15/999,154, filed on Aug. 17, 2018, now Pat. No. 11,616,771.
(Continued)

(51) Int. Cl.
*H04L 29/06* (2006.01)
*H04L 9/40* (2022.01)
(Continued)

(52) U.S. Cl.
CPC .......... *H04L 63/0815* (2013.01); *G06F 21/41* (2013.01); *G06F 21/604* (2013.01);
(Continued)

(58) Field of Classification Search
CPC ............. H04L 63/0807; H04L 63/0815; H04L 63/083; G06F 21/41; G06F 21/604; G06F 21/629; G06F 21/78
See application file for complete search history.

(56) References Cited

U.S. PATENT DOCUMENTS

2008/0127323 A1* 5/2008 Soin .................... H04L 63/0807
726/12
2014/0082715 A1* 3/2014 Grajek ................ H04W 12/068
726/8
(Continued)

OTHER PUBLICATIONS

Int'l Search Report and Written Opinion Appln No. PCT/US2018/000297 dated Nov. 5, 2018.
(Continued)

*Primary Examiner* — Jeffrey C Pwu
*Assistant Examiner* — Thong P Truong
(74) *Attorney, Agent, or Firm* — McAndrews, Held & Malloy, Ltd.

(57) ABSTRACT

Systems and methods are disclosed for accessing protected data. A computing device may have a secured stared storage accessible by two or more applications operating on the mobile device. The computing device may obtain a first token from an authorization service to verify user identity for a first application. The first token may be stored in the shared storage area, and be accessible to one or more applications sharing the storage space. In response to a user attempt to access a web service using a second application, the user identity may be verified using the first token. The authorization service may verify user credentials, and send a second token to the computing device. The second token may be a proxy ticket authorizing access and exchange of protected data between the second application and a web service. The second token may also be stored in the secure storage area.

20 Claims, 7 Drawing Sheets

Related U.S. Application Data

(60) Provisional application No. 62/547,667, filed on Aug. 18, 2017.

(51) Int. Cl.
*G06F 21/62* (2013.01)
*G06F 21/60* (2013.01)
*G06F 21/78* (2013.01)
*G06F 21/41* (2013.01)

(52) U.S. Cl.
CPC .......... *G06F 21/629* (2013.01); *G06F 21/78* (2013.01); *H04L 63/083* (2013.01); *H04L 63/0807* (2013.01); *H04L 63/0884* (2013.01); *H04L 63/102* (2013.01)

(56) References Cited

U.S. PATENT DOCUMENTS

2014/0250511 A1 9/2014 Kendall
2017/0006020 A1 1/2017 Fallodiya

OTHER PUBLICATIONS

"How to share Keychain between iOS apps"; http://evgenii.com/blog/sharing-keychain-in-ios/; accessed May 8, 2019.
"262 code results in DrKLO/Telegran"; https://github.com/DrKLO/Telegram/search?utf8=%E2%9C%93&q-account; GitHub, Inc.; 2019; accessed May 8, 2019.
"AccountManager"; https://developer.android.com/reference/android/accounts/AccountManager.html; accessed May 8, 2019.
"Create a custom account type"; https://developer.android.com/training/id-auth/custom_auth.html; accessed May 8, 2019.

* cited by examiner

APPLICATION USER SINGLE SIGN-ON

CROSS REFERENCE TO RELATED APPLICATIONS

This application is a continuation of U.S. patent application Ser. No. 15/999,154, Filed Aug. 1, 2018, which claims benefit under 35 U.S.C. § 119(e) of Provisional U.S. Patent Application No. 62/547,667, filed Aug. 18, 2017, now expired. The aforementioned documents are hereby incorporated herein by reference in their entirety.

BACKGROUND

Secure identity systems are often used by software systems to protect data. A user of computer or software system may have a user identity and associated credentials, such as a user name and password, that, when provided by the user, will allow the user to access protected data. The process of a user providing a user identity and verifying associated credentials is called a sign-on process. In some secure identity systems, after credentials are verified, a digital token may be issued that authorizes access to the protected data in the future using only the token and without having to provide credentials again.

A network-based secure identity system may include a computer device, such as a mobile phone, and a central authorization service, such as a web server. For example, a software application installed on a mobile phone may present a user interface to allow a user of the mobile phone to input credentials, which are sent to a central authorization service via the internet. If the central authorization service verifies the credentials, the central authorization service may send an authorization token back to the mobile phone. The mobile phone can then use the token to access protected data and services.

SUMMARY

The disclosure generally relates to accessing protected data using a shared secure storage to enable a single sign-on for one or more applications. In an embodiment, a system may be a computing device, such as a mobile device, and have a secured shared storage accessible and usable by two or more applications operating on the mobile device. To access a web service associated with a first application, the computing device may obtain a first token from an authorization service that can verify user credentials. User credentials may include a username and password. Once the first token, e.g., a proxy granting ticket is received, the first token may be stored in the shared storage area. When a user attempts to access a web service using a second application on the computing device, the user identity may be verified using the first token. The authorization service may receive the first token, an identifier of a second application, and a device identifier to verify user credentials, and send a second token, e.g. a newly issued proxy granting ticket, to the computing device. The second token may be a proxy ticket authorizing access and exchange of protected data between the second application and a web service, and the second token may also be stored in the secure storage area to replace the first token. The stored and shared token may be used later by the first application and the second application to access protected data on a web service.

In embodiments, the secure storage area is a part of the operating system of the computing device and in embodiments is a keychain storage on the device. One or more software development kits (SDKs) may be used to manage interactions between various system components, including communication with the authorization service, managing the secured storage, and implementing a unified log in between applications. In embodiments, each token is only valid for a predetermined period of time. Embodiments enable a secure, single sign-on functionality between a plurality of applications running on the computing device, wherein each application may access the secured shared storage.

BRIEF DESCRIPTION OF THE DRAWINGS

Various non-limiting embodiments are further described with reference to the accompanying drawings in which.

DETAILED DESCRIPTION OF ILLUSTRATIVE EMBODIMENTS

Various aspects of the present disclosure described herein are generally directed to improved techniques for managing user identities in multiple software applications. The provided examples are solely for purposes of clarity and understanding and are not meant to limit or restrict the claimed subject matter or relevant portions of this disclosure in any manner.

The techniques may simplify a user's interactions with applications, provide improved security of a user credential system and of user data, and simplify application software development. Embodiments may include a user identity and credentials that are shared among a plurality of software applications, an identity provider service, a central authorization service, and a local ID and token store that may be shared amongst a plurality of software applications. In an embodiment, after a user signs onto a first application on a computer device, the user will be automatically signed onto a second application that shares token storage with the first application. In some embodiments, a set of software tools called an identity management SDK is used by application developer, to manage identities of the users of an application, including managing identities of users across a plurality of applications.

An identity management SDK may manage shared token storage, manage interactions with a central authorization and identity provider service, provide other identity management services to client applications such as identity creation, provide authorization session management such as authorization token expiration and renewal, and enable single sign-on functionality across a plurality of software applications running simultaneously on a single device. Embodiments may decouple authorization from session management, where authorization of a user on a device is decoupled from authorization of a user in any particular application running on that device. For example, authorization of a user to use the first application can expire or be terminated without ending authorization for that user to continuing using the second application on the same device.

Figure 1:
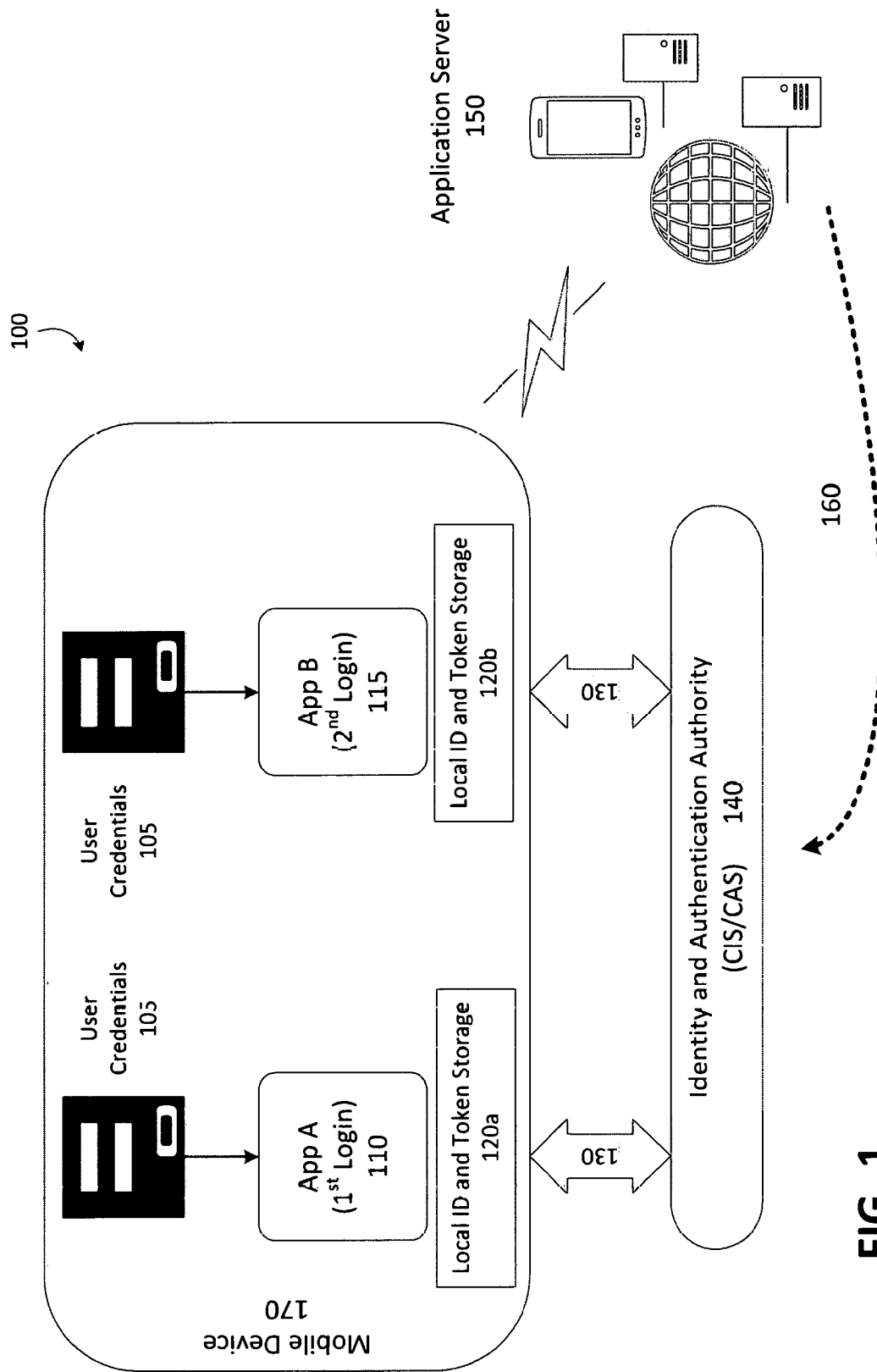
FIG. 1 is a block diagram of an example system for separate sign-on for separate applications.

By way of understanding, FIG. 1 depicts a block diagram of an example system having a separate sign-on for separate applications 100. In FIG. 1, two software applications, App A 110 and App B 115, execute on the same computing device, which may be a mobile computing device 170. The applications are in communication with one or more remote servers accessible over a network, such as application server 150. Application server may be a web service, for example. The applications also communicate with an Identity and Authentication Authority 140 to verify user credentials 105 entered at an application and return a local ID and token. In embodiments, App A 110 and App B 115 separately communicate with the same or different Identity and Authentication Authority to verify user credentials, and receive a local ID and token. The local ID and token may be stored in a storage space 120 specific to the requesting application, and used in subsequent communications between an application and the application server 150, as discussed herein.

During a separate sign-on authorization process, a user may be granted authorized access to each application via independent processes for obtaining authorization from an Identity and Authentication Authority 140. In embodiments, the separate sign-on authorization processes begins when a user accesses a first application, e.g., App A 110, on a mobile computing device 170. App A 110 attempts to access application server 150 to execute one or more functions and/or features of App A 110. However, in various embodiments, user credentials 105 may be required for the application to access and communicate data with the application server 150. In one example, the application server 150 may send a communication back to App A 110 indicating that credentials are required for access. App A 110 would then request credentials from the user, such as a user name and password, through a user interface on the mobile device 170, for example. App A 110 would then communicate the entered user credentials 105 with an Identity and Authentication Authority 140 for verification, as further described herein. In another example, when App A 110 has not yet provided valid credentials to the application server, the application server 150 may reroute 160 App A to the Identity and Authentication Authority 140 to request and verify entered user credentials.

The Identity and Authorization Authority, referred to herein as CIS/CAS, may be a central identity service (CIS) and/or central authorization service (CAS) accessible over a network 130. The CIS/CAS may receive user credentials entered through a user interface of an application, and check those credentials against a list or store of user accounts. If the user credentials are valid, e.g., match an existing user account, the CIS/CAS may return at least one of a local Ill and a token back to the application on the mobile device. Information exchanged between an application and the CIS/CAS may be encrypted by the application and/or the CIS/CAS for security purposes.

The local ID may be a unique identification of the user accessing the application, and may or may not be the same as a user name or identifying credential entered by the user. The token may be a key or other authoritative information usable with the application server 150, to indicate that the user is valid and authorized to access the server 150, and in embodiments, one or more services provided by the server. In embodiments, the token may be set to be valid for a predetermined period of time. The local ID and token may be stored in a storage area 120 associated with the application, such that they may be accessed and provided when verification is required for additional communications with the application server 150. In an example, the storage 120 allows for a user to stay logged-in to an application, and eliminates a need for the user to enter credentials each time the application is opened or one or more features or communications are requested from the application server 150. The local ID and token may be called from the storage 120 to provide verification of valid user credentials, and as such, multiple requests to the CIS/CAS are unnecessary.

The same process may be repeated when a user accesses other applications, such as App B 115. An attempted communication with the application server 150 may result in the App B presenting a user interface on the mobile device for a user to enter credentials 105, which, once received, will be passed on to the CIS/CAS 140 over a network 130. The CIS/CAS will provide a local ID and token upon verification and pass the information back to App B 115 for storage at 120b. Accordingly, the process may be repeated separately for each application, for example, where each process presents a separate user interface, and in embodiments, a user must enter credentials twice, even when the credentials are the same and the same CIS/CAS service is used to grant authorization based on the credentials.

It will be appreciated that in a separate sign-on configuration, local IDs and tokens are stored in a storage area 120 specific to the requesting application. For example, a local ID and token received from the CIS/CAS for credentials entered at App A 110 will be stored in storage 120a, and the local ID and token received from the CIS/CAS for credentials entered at App B will be stored in storage 120b. The storage areas 120a, 120b are separate and not accessible by other applications. Accordingly, in the embodiment depicted in FIG. 1, App B 115 cannot access storage 120a, and App A 110 cannot access storage 120b. Even in embodiments where App A and App B may be related, communicate with the same CIS/CAS, and/or utilize the same local ID and token for user access and verification with an application server 150, each application must go through separate sign-on processes, and cannot access another application's local ID and token storage 120. Accordingly, from the user perspective, the user will be asked to provide credentials for each application, even when the credentials are the same for each application, and when the applications are related.

Figure 2:
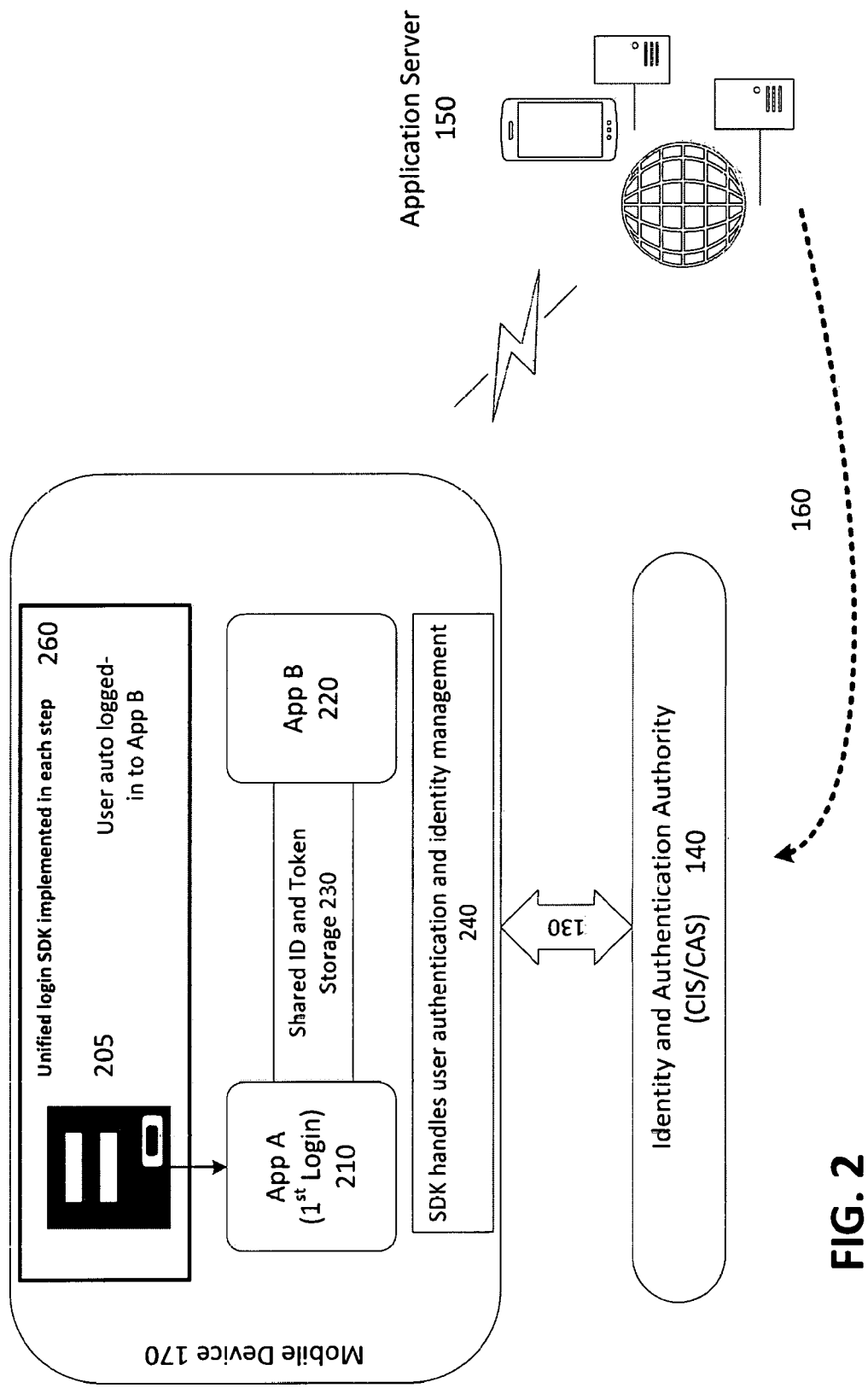
FIG. 2 is a block diagram of an example system for single sign-on for separate applications.

FIG. 2 illustrates a block diagram of an example system for single sign-on for one or more applications. As illustrated in FIG. 1, two software applications, App A and App B, run on a mobile device computer 170, and both applications may be authorized by a CIS/CAS 140 service based on user credentials 205 supplied by a user of the mobile device. Although the example illustrates an embodiment wherein two applications share a single sign-on, such a system would also work for any number of applications in a similar manner. In embodiments, a first application 210 requests user credentials 205, passes the credentials to the CIS/CAS over network 130, and receives authorization, i.e., an ID and token, from the CIS/CAS 140. But unlike FIG. 1, the received authorization information is stored in a shared ID and token storage 230. The shared storage 230 is accessible by one or more other applications, e.g., App B 220, such that other applications sharing the storage may detect that a sign-on has already been completed. App B may then communicate with server 150 using the authorization information granted to the user of the first application. In some embodiments, the second and subsequent applications running on the same device as the first application may assume that the user identity and associated credentials used for sign-on of the first application will apply to the subsequent applications.

Also in contrast to FIG. 1, App A may cooperate with App B via a shared set of software tools. In various embodiments, one or more software tools, such as an SDK may assist with user logins, user authentication and identity management. With respect to FIG. 2, a unified login SDK 260 may be implemented in each step of the login process. For example, when an application receives a communication requiring a login, or user credentials to communicate with the application server 150, the login SDK 260 may first check the shared ID and token storage 230 to determine whether the requested authorization information is available. If the token and ID information are available, the information is used to login the application so that communication with the application server 150 may be established. Alternatively, if the token and ID information are not available within the shared storage space 230, then the application will request the user credentials from the user, through an input screen on an interface on the mobile device 170, for example. As discussed above, once authorized, the ID and token will be stored in the shared storage space 230. Any subsequent login requests, either from the same application or a different application associated with the shared storage request, will be able to use the stored authorization information.

One or more user authentication and identity management SDKs 240 may also be utilized in conjunction with the process described above, and may be utilized instead of or in addition to the unified SDK and other software tools utilized in various applications on the mobile device. For example one or more SDKs, e.g., user authentication and identity management SDK 240, may manage shared token storage, manage interactions with a central authorization and identity provider service, provide other identity management services to client applications such as identity creation, provide authorization session management such as authorization token expiration and renewal, and enable single sign-on functionality across a plurality of software applications running simultaneously on a single device.

The following examples with respect to FIG. 2 illustrate various methods and implementations in which the shared storage 230 may be utilized in a single sign-on system. In an example, the shared storage does not initially contain authorization information for App A and App B. A user may first log into App via the processes described above, and an ID and token usable for communication between App A and the application server 150, may be received from the CAS/CIS and saved in the ID and token in the storage space 230 shared with App B. When the user accesses App B, App B automatically determines that an applicable ID and token is in the shared storage 230, and App B uses the ID and token to communicate with the application server 150. In this manner, the user does not need to re-enter user credentials 205 in order to log into App B.

However, if the user then deletes App A, App B's log in will not be affected, even though App A was initially used to obtain the authorization information from CIS/CAS. The shared storage space 230 remains so long an application associated with the shared space remains. Thus, the storage space and its stored authorization information, e.g., ID and token, remain, and will remain so long as App B is on the mobile device.

In another example, a user logs into App A 210 and deletes App A before logging into App B 220. Similar to the previous example, the user would nevertheless be able to log into App B without re-entering user the user credentials. The shared storage space 230 may store the authorization information upon receipt from the CIS/CAS. Accordingly, because App B shared the storage space upon the deletion of App A, the storage space 230, including its contents, i.e., the authorization information, remains in the storage space. Thus, when the user accesses App B, App B may automatically log in using the authorization information stored in the storage space.

In yet another example, if App A is downloaded, and a user logs into App A but deletes App A before downloading App B, a user will have to log in again when accessing App B. In this example, the shared storage space 230 would only be accessible by App A while App A remained on the device. Since App A was deleted before downloading App B, the shared storage space would have been deleted and a new storage space would get established upon the download of App B. However, as discussed above, if App B had been downloaded before the deletion of App A, then a second user log in for App B would not be required.

Accordingly, so long as the shared storage space exists, if the authorization information is stored in the shared space 230, then both App A and App B will be able to automatically log in, without requiring user credential information to be reentered, regardless of users signing out or deleting or reinstalling an application. In addition, throughout the various embodiments described herein, it will be appreciated that the shared storage space 230 is a long term storage device. Therefore, when the mobile device 170 shuts down or restarts, for example, the information stored in the shared space 230 is not deleted.

Figure 3:
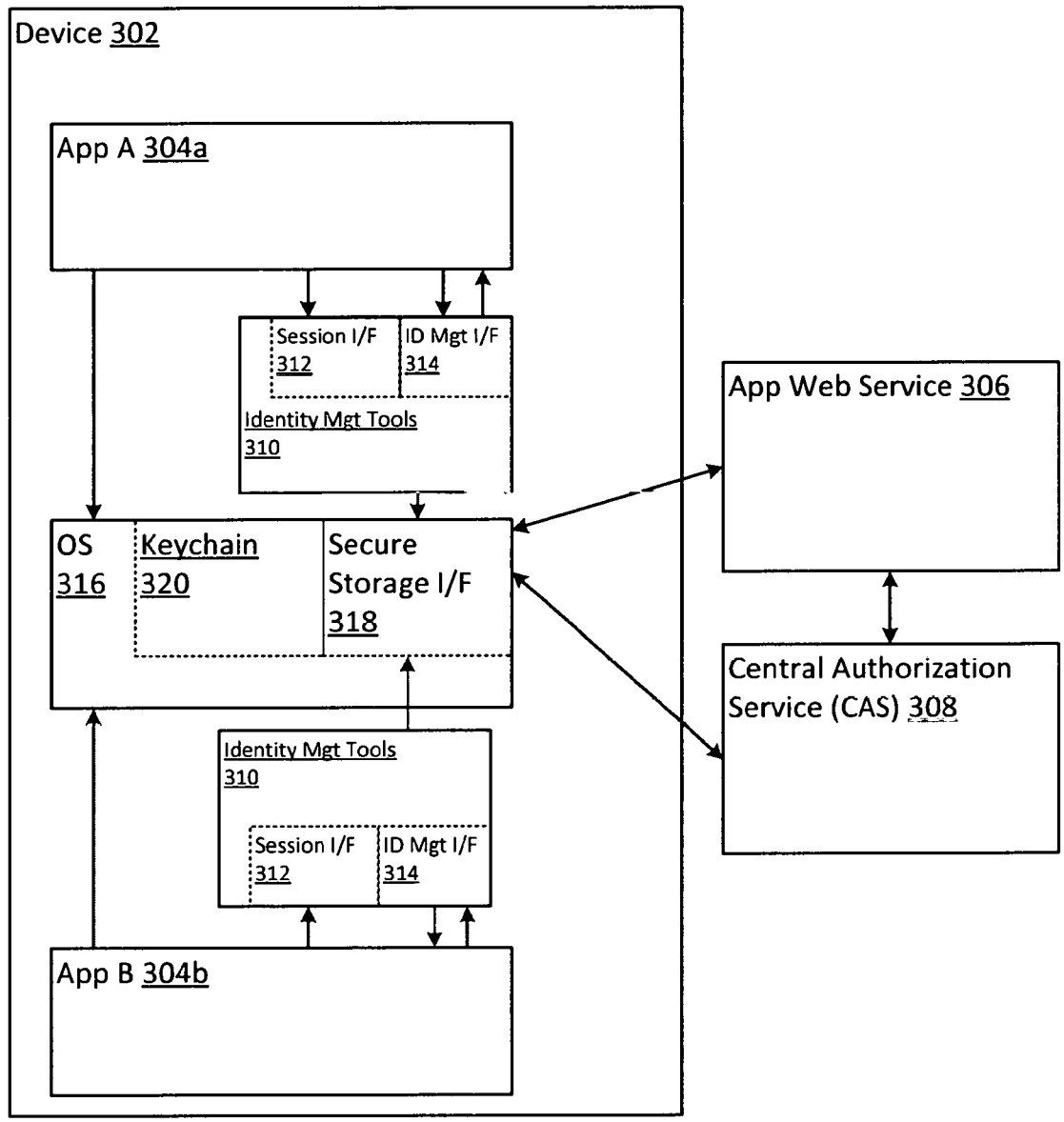
FIG. 3 depicts software component communication for an example user authorization system.

FIG. 3 depicts software component communication for an example user authorization system, in accordance with embodiments described herein. Device 302 includes software components comprising Application A 304a, Application B 304b, operating system 316, and identity management tools 310. Services, such as an application web service 306 and central authorization service (CAS) 308, may be software components running on other computers and may communicate with software components on device 302 via a network connection such as the internet. Application web service 306 may store protected user data or perform protected operations and may trust CAS to control access to the protected user data or protected operations. Identity management tools 310 may expose software interfaces for authorization session 312 and identity management 314. Operating system 316 may expose a software interface for a secure storage 318 and a keychain 320.

Each application 304 may use services of the operating system 316, for example, to present to a user a user interface to receive user credentials, such as a sign-on screen specifying a user name and password. Each application 304a, 304b may also establish a trust relationship between the application 304a, 304b and the operating system 316.

Application 304 may use identity management tools 310 to manage user identities generally, for example, via an identity management interface 314. Managing a user identity may include creating a new identity for a new user such as username or user account, and may include changing a password or other credentials associated with an identity. Identity management tools 310 may implement user identity management functions in cooperation with the CAS 308.

Application 304 may use session interface 312 exposed by identity management tools 310 for management of authorized sessions and for access to protected data and protected operations of app web service 306. A session may be authorized by CAS 308 using credentials supplied by a user of application 304. For example, a user of app 304a may support a username and password that is passed to the CAS, and the CAS may then provide one or more tokens may be used to access protected data or operations of app web service 306. Tokens from CAS include data that is secured via encryption and a digital signature, and may be valid only for a limited period of time. A user of application 304a may be authorized to access protected services or data of application 304a and of app web service 306 only while a session is authorized or a token for that session is valid. Session validity may be indicated or determined by the period of time for which a token associated with a user identity is valid. Identity management tools 310 may implement features of the session management interface 312 using services of a secure storage interface 318 of the operating system, and using the services of app web service 306 and CAS 308.

To authorize a user session, application 304 may obtain user credentials from a user for an identity associated with the user, pass these credential to the identity management tools 310 via session interface 312, which may then pass on the credentials to CAS 308. The CAS 308 may verify those credentials and issue one or more tokens that authorize the identity. Tokens may be stored in a secure store by identity management tools interface 310 via secure storage interface 318 and a keychain storage 320. Examples of a secure storage interfaces 318, 320 include the Shared Keychain on iOS devices from Apple and the Account Manager feature of the Google's Android operating system. These secure storage features of an operating system may depend, for example, on a trust relationship between an application 304 and operating system 316. Protected data and protected services of app web service 306 may be accessed using authorization tokens issued by CAS 308.

Figure 4:
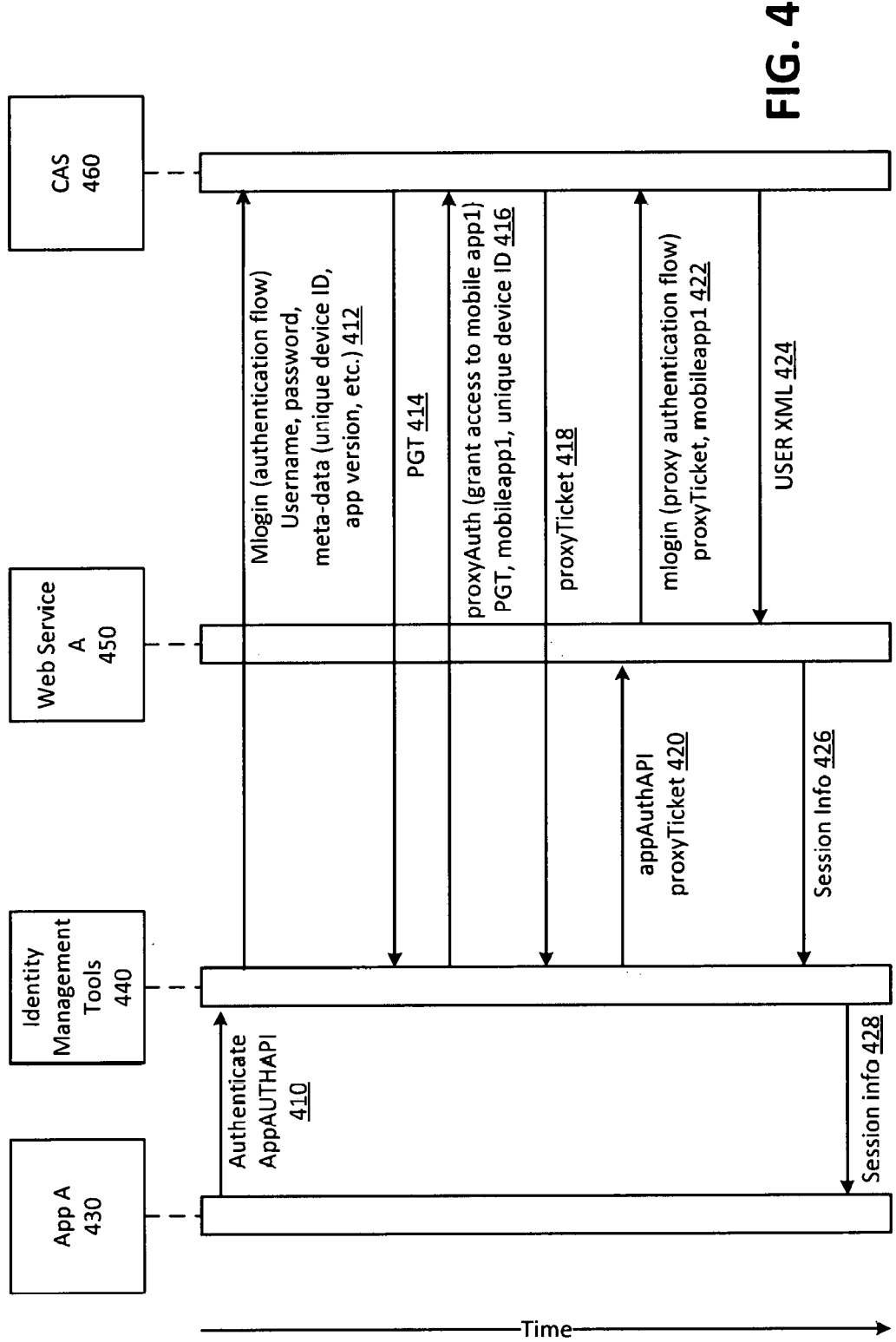
FIG. 4 is an example communication flow diagram for sign-on in a first application.

FIG. 4 is an example communication flow diagram for sign-on in a first application. A first application, App A 430, may attempt to access protected data or protected operations associated with a user at Web Service A 450. After App A 430 is granted access to protected data or operations in FIG. 4, another application, App B 530, is granted access to protected data in FIG. 5. Overall, the process includes: a long-term registration of a user of App A 430 with the CAS 460 (operations 412, 414) to obtain a proxy granting ticket (PGT); a short term registration of each application with the CAS (App A registers with operations 416 and 418; App B registers in 512 and 514) to obtain a proxy ticket (PT) for each application; and accessing the protected data (operations 420 to 428 for Mobile App A, and operations 516 to 524 for Mobile App B). Note that in FIGS. 4 and 5, where an arrow crosses over a web service, as in the communication operations 412-418 passing over Web Service A, the arrows may be interpreted as communication bypassing Web Service A and not communicating through Web Service A. Alternatively, arrows crossing over a web service may be interpreted as communication being received at and redirected by the bypassed web service.

Figure 5:
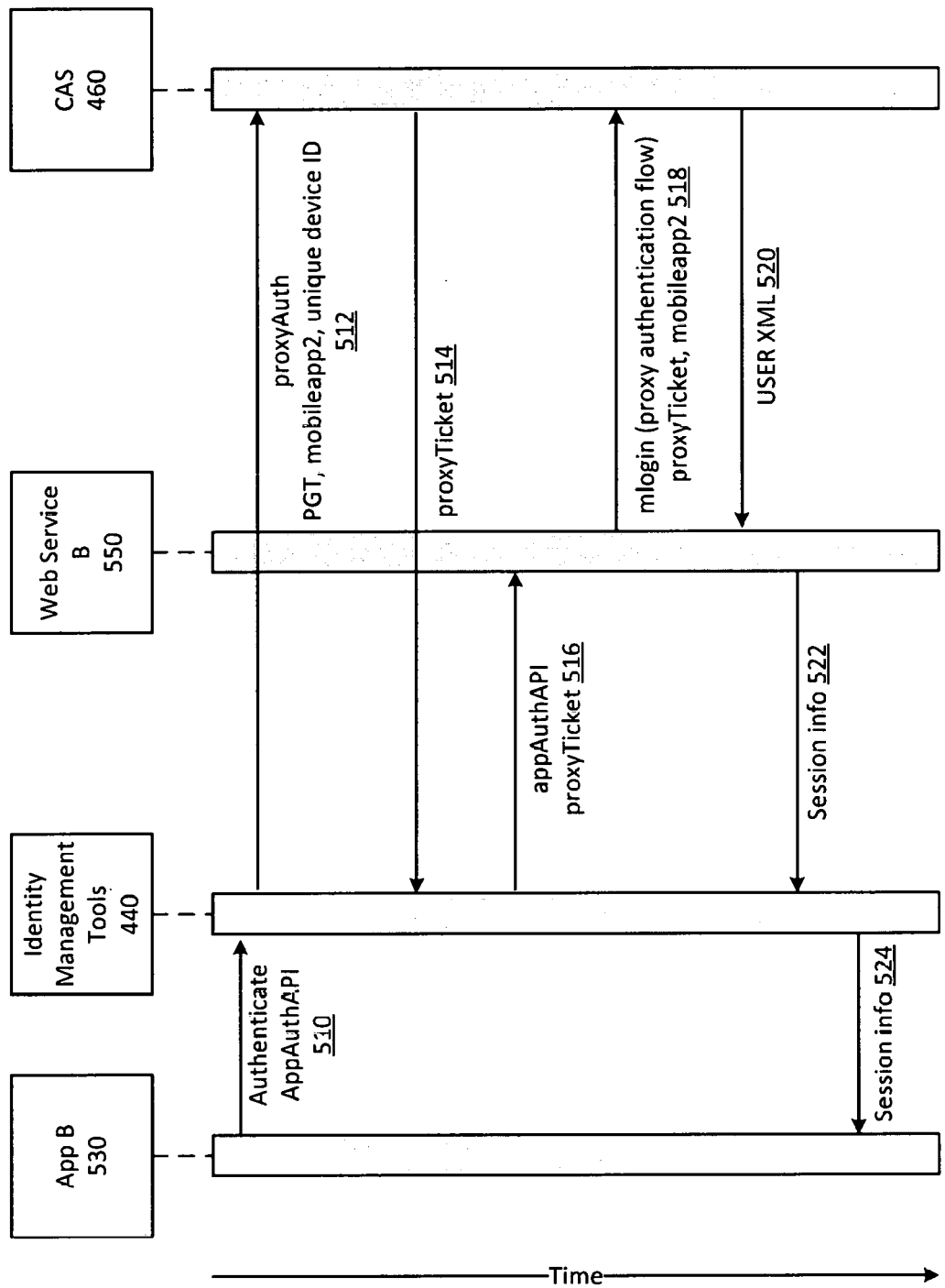
FIG. 5 is an example communication flow diagram for sign-on in a second application.

In the example of FIGS. 4 and 5, App A and App B may be separate software applications running the same computer device such as a mobile phone. Identity management tools may be a software component such as identity management tools 310 of FIG. 3. Web Services A and B may be software services running on computer servers and may provide access to protected operations or data for use by App A and App B, respectively. For example Web Service A may be a software service running on web server that is connected to the App A device via the internet. CAS may be a software service running on another web server, and may provide authorization to access protected data or protected operations.

To begin a single sign-on process, the identity management tools software component 440 obtains a proxy granting ticket (PGT) from the CAS. In operation 410, App A authenticates with an identity management tools via App-AUTHAPI. In response, the identity management tools software component completes a long-term registration of itself (the identity management tools software component on a particular device) with a content access service (CAS) using credentials for a user's identity and metadata. The metadata may include a unique identifier for the device on which App A and App B are running, and a version number of the requesting app, which is the version number App A in the case of FIG. 4. If the credentials and metadata are verified by the CAS, the CAS responds in 414 by sending a PGT back to the identity management tools.

The PGT may be associated by the CAS with the device identified in the metadata. The received PGT may be stored by identity management tools in a token storage that is shared with other applications on the device. Tickets such as the PGT and PT may be data comprising a secure digital certificate. A PGT may have a long term duration of validity, for example 15 days, during which the PGT may be used repeatedly, and after which the PGT may expire. A new PGT may be obtained after a PGT expires.

After obtaining a PGT, the PGT may be used during its duration of validity to obtain a PT for a particular app. In operation 416, the identity management tools send the previously obtained PGT along with an identifier for application App A and the device identifier to the CAS 460. If the PGT is valid and matches to the unique device identifier for which the PGT was granted, the CAS may respond by sending a PT back to the identity management tools in operation 418. A PT may be associated with a single PGT, and may be associated with the identified application on the identified device. A PT may have a shorter duration of validity than the PGT, for example 5 minutes, after which the PT may expire and become invalid.

Protected user data may be accessed with a valid PT. Accessing protected user data may include retrieving, changing, storing, or performing other protected operations on the protected user data. In the example of FIG. 4, the PT is passed from the identity management tools to a remote service, Web Service A, being used by App A in operation 420, and then Web Service A may request access to protected user data in operation 422 by providing the PT and an identifier of the application (App A in the example of FIG. 4). If the PT is valid and issued to (associated with) the identified application, the CAS may respond by providing protected user data, such as user XML data, in operation 424. Web Service A may then parse the data provided by the CAS into session information that is passed back to the IDP in operation 426. The session information may then be further passed on from the IDP to App A in operation 428.

FIG. 5 is an example communication flow diagram for sign-on in a second application. After a PGT has already been obtained for a device, for example with operations 412 and 414 of FIG. 4, a second application on that device, such as App B, may also access protected user data without obtaining credentials from a user, and without providing user credentials to a CAS. Instead, in response to operation 510 from App B, the identity management tools may discover via shared token storage that a PGT for the device has already been obtained. The identity management tools may then, in operation 512, send the valid PGT obtained from shared token storage along with an identifiers for the application and the device to the CAS 460 to request a new PT for the second application. If the PGT is valid for the identified device, a new PT associated with the second application is returned to identity management tools in operation 514.

Once a PT for App B 530 is obtained, protected user data in Web Service B may be accessed by App B. In operation 516, the PT is passed to the Web Service B 550, which may then pass the PT on to the CAS 460 along with an identifier for App 2 in operation 518. User data, such as user XML data, may be returned from the CAS back to the Web Service B 550 in operation 520. The user data may be parsed and passed on to identity management tools as session information in operations 522, and finally the session information is passed to App B 530 in operation 524.

Each app, such as Apps A and B, may manage their own session for access to protected data and protected operations. A session may be a period of time for which a particular app on a particular device is authorized for a particular user. In some cases a session may be authorized as a guest user without user credentials.

In some embodiments, only one user identity may be authorized at a time for a particular device. Hence, in some embodiments, an individual app may not be able to log out or sign off a user or switch to another user. Instead, a user may only be logged out of the entire device, for example by removing the user identity from the identity management tools. Removing the user in the manner effectively logs a user out for all apps on that device.

In some embodiments, applications on a single device, such Apps A and B of FIGS. 4 and 5, may share a secure token storage. A secure token storage may be, for example, a password manager such as an App Group/Keychain on a device with the iOS operating system, or may be an Account Manager on a device with the Android operating system. The contents of shared secure token storage may include a secure credential storage (SCS). An example SCS is described below:

{
IDs:
[CIS_ID1: {PGT1, First Name, Last Name, Image URL,
    email,
    Last_login_timestamp}, . . . ],
[CIS_ID2: {PGT2, First Nwne2, . . . }],
Device_id:
Device_id
} wherein Device_id may be a unique identifier for the device that the identity management tools component generates. This unique identifier may remain unchanged across all applications on the device as long as at least one application using the shared storage is still installed on the device (similar to a universally unique identifier (UUID) on iOS). In addition to the shared storage above, each instance of the identity management tools (for example for each application using identity management tools) may store the currently active account (CAA), such as CIS_ID1 in the SCS example above.

The following examples describe interactions which may occur between an application (such as App A of FIG. 4), and an identity management tools software component, in accordance with embodiments discussed herein. The identity management tools may provide a getter method exposed to the app to retrieve a proxy ticket. The proxy ticket may be used by an application, e.g., App A, and an associated web service, e.g., Web Service A, to manage sessions.

Every application may also register a callback method (such as user_switch( )) with the identity management tools component that will be invoked when a new account is activated. The identity management tools component may issue a PT for the client application for the most recent user. The application may also handle session management based on this PT.

Another callback method may be registered with the identity management tools component when an account is removed, for example user_removed( )). An application may not perform user interface related activities in this phase. Applications may also register a callback (such as anonymous_user( )) to handle anonymous flows. This type of callback may be invoked when the user switches to Guest mode, for example.

Every application may be able to furnish a unique application identifier (such as App_ID) to the identity management tools component. This identifier may be from a service that is centralized and configurable.

An example process that an identity management tools component may perform when a first application, e.g., App A of FIG. 4, launches on a device includes generating a universally unique identifier (UUID). In an embodiment, the identity management tools may determine if the UUID is the same as Device_ID. If yes, then other applications, e.g., App B, which may be related to the first application, are installed onto the device. The other applications will honor, i.e., utilize, the contents of the Keychain or secured storage to log in, in accordance with the systems and methods discussed above. If, however, the UUID is determined not to be the same as Device_ID, then this may be indicative that the application is not related to or associated with other applications on the device, and users may have to log in to retrieve the proper validation for interaction with a web service. In this example, when the UUID and Device_ID do not match, then any existing contents of the SCS, in a secure storage or a Keychain, for example, may be reset. It will be noted that Keychain contents are persisted even after all applications on a device are removed. After the identity management tools generates the UUID, then a service may be called to fetch app-specific metadata and given an App_ID (e.g., logo for login interface, T&C, etc.) so that the user interface may be customized for the application.

The identity management tools component may also perform one or more processes for every application launch, including the first launch of an application. In an example, the identity management tools may first check if SCS exists. If the SCS does not exist, this indicates that the application is being installed for the first time, and Device_ID is stored in SCS, and the account management interface may be launched for the user to login.

If the SCS is indeed found to exist, then a SCS Sync may be performed, wherein the identity management tools checks whether the CAA is present in a list of accounts in the SCS. This SCS Sync also accounts for the case when an account is removed from another application. This step may also be performed each time an application comes to the foreground. Accordingly, if the CAA is not present in the SCS, then the CAA is cleared, a user_removed( ) function may be called, and an Account Management Interface may be invoked to add or select an existing user. Alternatively, if the CAA is found to be present in the SCS, the then the identity management tools may invoke the following: (i) Read CIS IDs and associated data; Check whether the PGT is valid, and if not, refresh the PGT and write to SCS; and (iii) if the present launch is the first launch of the application, the launch the account management interface to select an account.

In yet another example, when an application is deleted, pushed to the background, or killed, no action may be necessary from the identity management tools component.

The identity management tools component may also perform one or more processes for account management. The following account management examples may be exposed, for example, via ID management interface 314 of FIG. 3.

An account management process for adding a user—whether a first user or an additional user—may include the following: (i) getting user credentials, including additional states/logic for associated store accounts, resetting passwords, etc.; (ii) authenticating with the CAS/CIS and receiving the PGT; (iii) receiving basic profile data; (iv) storing basic profile data and PGT in SCS as a new entry in IDs array; (v) setting the CAA; and (vi) calling a user_switch( )function.

An account management process for selecting an existing user may include one or more of the following: (i) Retrieving PGT from SCS; (ii) checking if PGT is valid, and if not, refresh PGT and write to SCS; (iii) setting the CAA; and (iv) calling a user_switch( ) function.

An account management process for removing a user may include one or more of the following: (i) deleting all information in SCS for a CIS ID; (ii) clearing the CAA if the deleted account is the same as CAA; (iii) calling a user_removed( )function for the application to perform a cleanup/destruct; and (iv) purge session data if the should PGT be invalidated with CAS/CIS Purge session data?

An account management process for acting as a guest or logging in as a guest may include clearing the CAA and calling an anonymous_user( )function.

The various features and processes described above may be used independently of one another, or may be combined in various ways. All possible combinations and sub-combinations are intended to fall within the scope of this disclosure.

Figure 6:
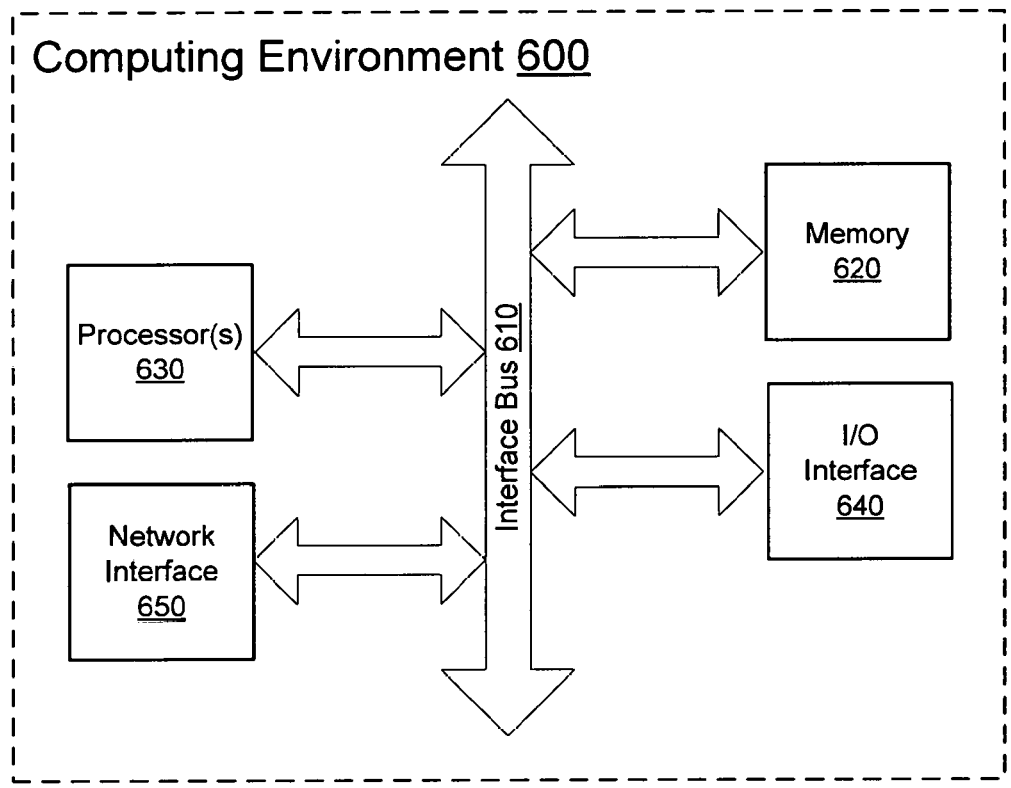
FIG. 6 depicts an example computing environment in accordance with an embodiment.

FIG. 6 depicts an example computing environment 600 suitable for implementing aspects of the embodiments of the present invention. As utilized herein, the phrase "computing system" generally refers to a dedicated computing device with processing power and storage memory, which supports operating software that underlies the execution of software, applications, and computer programs thereon. As used herein, an application is a small, in storage size, specialized program that is downloaded to the computing system or device. In some cases, the application is downloaded from an "App Store" such as APPLE's APP STORE or GOOGLE's ANDROID MARKET. After download, the application is generally installed on the computer system or computing device. As shown by FIG. 6, computing environment 600 includes bus 610 that directly or indirectly couples the following components: memory 620, one or more processors 630, I/O interface 640, and network interface 650. Bus 610 is configured to communicate, transmit, and transfer data, controls, and commands between the various components of computing environment 600.

Computing environment 600 typically includes a variety of computer-readable media. Computer-readable media can be any available media that is accessible by computing environment 600 and includes both volatile and nonvolatile media, removable and non-removable media. Computer-readable media may comprise both computer storage media and communication media. Computer storage media does not comprise, and in fact explicitly excludes, signals per se.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EE-PROM; flash memory or other memory technology; CD-ROMs; DVDs or other optical disk storage; magnetic cassettes, magnetic tape, magnetic disk storage or other magnetic storage devices; or other mediums or computer storage devices which can be used to store the desired information and which can be accessed by computing environment 600.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 620 includes computer-storage media in the form of volatile and/or nonvolatile memory. The memory may be removable, non-removable, or a combination thereof. Memory 620 may be implemented using hardware devices such as solid-state memory, hard drives, optical-disc drives, and the like. Computing environment 600 also includes one or more processors 630 that read data from various entities such as memory 620, I/O interface 640, and network interface 650.

I/O interface 640 enables computing environment 600 to communicate with different input devices and output devices. Examples of input devices include a keyboard, a pointing device, a touchpad, a touchscreen, a scanner, a microphone, a joystick, and the like. Examples of output devices include a display device, an audio device (e.g., speakers), a printer, and the like. These and other I/O devices are often connected to processor 610 through a serial port interface that is coupled to the system bus, but may be connected by other interfaces, such as a parallel port, game port, or universal serial bus (USB). A display device can also be connected to the system bus via an interface, such as a video adapter which can be part of, or connected to, a graphics processor unit. I/O interface 640 is configured to coordinate I/O traffic between memory 620, the one or more processors 630, network interface 650, and any combination of input devices and/or output devices.

Network interface 650 enables computing environment 600 to exchange data with other computing devices via any suitable network. In a networked environment, program modules depicted relative to computing environment 600, or portions thereof, may be stored in a remote memory storage device accessible via network interface 650. It will be appreciated that the network connections shown are exemplary and other means of establishing a communications link between the computers may be used.

Figure 7:
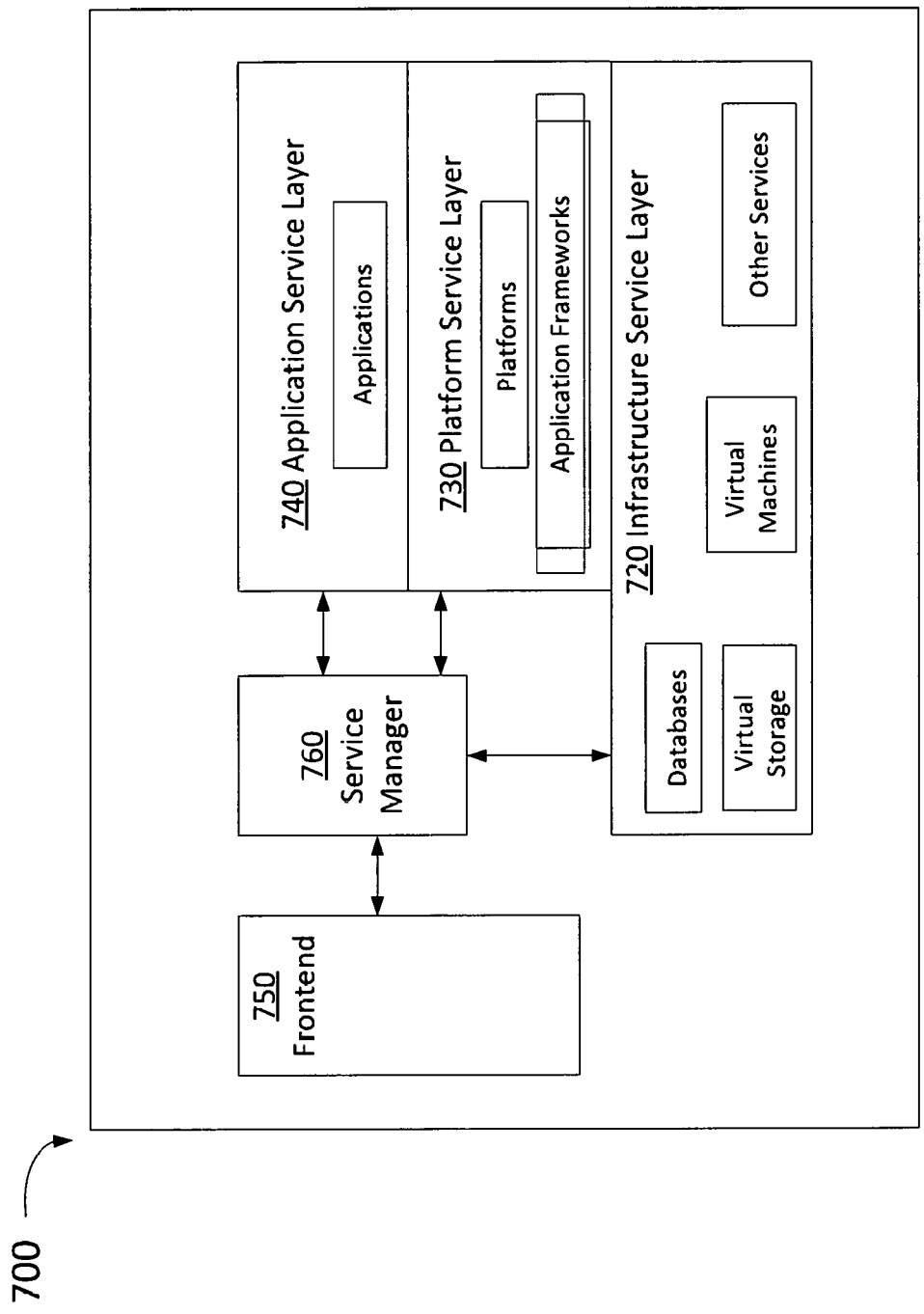
FIG. 7 depicts an example server in accordance with an embodiment.

FIG. 7 is a schematic diagram illustrating an example server 700 that may be used in accordance with the present disclosure. A server 700 may provide infrastructure services, platform services, and software application services, in accordance with embodiments described herein. In an embodiment, server 700 may be a cloud-based server in accordance with web service and application servers describe throughout the present disclosure. The infrastructure services may include virtualized resources, such as virtual machines, virtual storage, and so on. The infrastructure services may also include virtualized services, such as database services and others. Each of these infrastructure services may be deployed in an infrastructure service layer 720.

The scale and various aspects, such as data, connectivity, and dependency relationships within and between service components, of an infrastructure service deployment are configurable by an administrator user. For instance, the administrator user may submit a configuration specification to server 700 via a frontend interface 750 and service manager 760. The configuration specification can be translated into infrastructure and kernel level APIs calls that create, re-create, move, or delete components such as virtual machines and services, and assign or change attributes of the components.

In addition to the infrastructure services, server 700 may also provide platform services, such as an environment for running virtual machines or a framework for developing and launching a particular type of software applications. The platform services may be implemented in a platform service layer 730 over the infrastructure service layer 720, and may employ one or more infrastructure services configured in a particular manner. Configuration of platform services can be accomplished by program code written according to the APIs of the platform services and, optionally, the APIs of the infrastructure services that are employed in enabling the platform services.

In some examples, server 700 may also provide software application services in an application service layer 740. A software application can be installed on one or more virtual machines or deployed in an application framework in the platform service layer 730. The software application can also communicate with one or more infrastructure service components, such as databases, in the infrastructure layer 720. The installation and configuration of the software application in the application service layer 740 can be accomplished through APIs of the software itself and the APIs of the underlying platform and infrastructure service components.

Depending on the type of services, a service user may be granted different levels of control in configuring the services. For example, if a software application service is employed, an administrator user is given control over how the software application is configured. If a platform service is employed, an administrative user is given control over how the platform and/or application frameworks are configured. Similarly, if infrastructure services are employed, an administrative user is given control over the particular infrastructure services employed.

The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive. It is to be understood that the subject matter defined in the appended claims is not necessarily limited to the specific features or acts described above. Rather, the illustrations of the aspects described herein are intended as examples of implementing the claims and other equivalent features and acts are intended to be within the scope of the claims.

The techniques, or certain aspects or portions thereof, may, for example, take the form of program code (i.e., instructions) embodied in tangible storage media or memory media implemented as storage devices, such as magnetic or optical media, volatile or non-volatile media, such as RAM (e.g., SDRAM, DDR SDRAM, RDRAM, SRAM, etc.), ROM, etc., that may be included in computing devices or accessible by computing devices. When the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and sub-combinations are intended to fall within the scope of this disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for accessing protected data, the system comprising:
a secure storage that is established in response to downloading an application onto a computing device;
a processor; and
a memory storing a set of instructions that, when executed by the processor, cause the system to at least:
obtain a first token associated with a user identity for accessing a first application;
store the first token in the secure storage;
send, to an authorization service, the first token, an identifier of a second application, and a device identifier;
receive, from the authorization service, a second token authorizing communication between the second application and a web service;
store the second token in the secure storage to replace the first token; and
access, from the web service, protected data associated with the user identity.

2. The system of claim 1, wherein the instructions cause the system to:
receive user credentials for a login to the first application;
send the user credentials to the authorization service; and
verify the user credentials at the authorization service.

3. The system of claim 1, wherein the secure storage is a keychain on an operating system of the computing device.

4. The system of claim 1, wherein the secure storage is shared between two or more applications on the computing device.

5. The system of claim 1, wherein at least one of the tokens are valid for a predetermined period of time.

6. The system of claim 1, wherein the first token is a proxy granting ticket (POT).

7. The system of claim 1, wherein the second token is a proxy ticket (PT).

8. A method for accessing protected data, comprising:
obtaining a first token associated with a user identity for accessing a first application on a computing device;
storing the first token in a secure storage on the computing device, wherein the secure storage is established in response to downloading an application on the computing device;
sending, to an authorization service, the first token, an identifier of a second application, and a computing device identifier;
receiving, from the authorization service, a second token authorizing communication between the second application and a web service;
storing the second token in the secure storage to replace the first token; and
accessing, from the web service, protected data associated with the user identity.

9. The method of claim 8, further comprising:
determining whether the first token is available in the secure storage; and
requesting user credentials if the token is unavailable.

10. The method of claim 8, wherein the first token is a proxy granting ticket and the second token is a proxy ticket.

11. The method of claim 8, comprising entering a user name and password to obtain the token.

12. The method of claim 8, wherein the secure storage is a keychain on an operating system of the computing device.

13. The method of claim 8, wherein the secure storage is shared between two or more applications on the computing device.

14. The method of claim 8, wherein authorizing a communication between the second application and the web service comprises establishing a session for a period of time.

15. A non-transitory computer-readable storage medium comprising instructions stored thereon that, when executed by a computing device, cause the computing device to at least:
obtain a first token associated with a user identity for accessing a first application;
store the first token in a secure storage, wherein the secure storage is established in response to downloading an application on the computing device;
send, to an authorization service, the first token, an identifier of a second application, and a device identifier;
receive, from the authorization service, a second token authorizing communication between the second application and a web service;
store the second token in the secure storage to replace the first token; and
access, from the web service, protected data associated with the user identity.

16. The non-transitory computer-readable storage medium of claim 15, comprising instructions to:
receive user credentials for a log in to the first application;
send the user credentials to the authorization service; and
verify the user credentials at the authorization service.

17. The non-transitory computer-readable storage medium of claim 15, wherein the secure storage is a keychain on an operating system of the computing device.

18. The non-transitory computer-readable storage medium of claim 15, wherein the secure storage is shared between two or more applications on the computing device.

19. The non-transitory computer-readable storage medium of claim 15, wherein at least one of the tokens are valid for a predetermined period of time.

20. The non-transitory computer-readable storage medium of claim 15, wherein the first token is a proxy granting ticket and the second token is a proxy ticket.

* * * * *